(12) United States Patent
Rhee et al.

(10) Patent No.: US 8,073,135 B2
(45) Date of Patent: Dec. 6, 2011

(54) BINDER IDENTIFICATION

(75) Inventors: Wonjong Rhee, Palo Alto, CA (US); Bin Lee, Palo Alto, CA (US); Iker Almandoz, Palo Alto, CA (US); John M. Cioffi, Atherton, CA (US); Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 1271 days.

(21) Appl. No.: 11/342,028

(22) Filed: Jan. 28, 2006

(65) Prior Publication Data
US 2007/0036340 A1 Feb. 15, 2007

Related U.S. Application Data

(60) Provisional application No. 60/679,508, filed on May 10, 2005, provisional application No. 60/698,113, filed on Jul. 10, 2005.

(51) Int. Cl.
*H04M 9/00* (2006.01)
(52) U.S. Cl. ............... 379/417; 379/415; 379/22.01; 379/22.02; 379/22.04; 379/32.02; 703/2; 375/267
(58) Field of Classification Search ........... 379/414–417
See application file for complete search history.

(56) References Cited

U.S. PATENT DOCUMENTS 5,181,198 A 1/1993 Lechleider
(Continued)

FOREIGN PATENT DOCUMENTS

CN 101461253 6/2009
(Continued)

OTHER PUBLICATIONS

"International Search Report and Written Opinion", PCT Application No. PCT/US2007/013393, (Jan. 4, 2008).

(Continued)

*Primary Examiner* — Fan Tsang
*Assistant Examiner* — Ibraham Sharifzada
(74) *Attorney, Agent, or Firm* — Blakely, Sokoloff, Taylor & Zafman

(57) ABSTRACT

Methods, techniques and apparatus identify members and characteristics of binders and/or other groups of communication lines such as those in a DSL system. Information obtained includes the identification (for example, by scanning) of significant crosstalking "offenders" and their "victims" that are affected by the crosstalk. One or a small number of modems are instructed to transmit with preselected transmit spectra, after which evidence of crosstalk in the noise spectrum data is examined for potential victim lines. Direct evidence of noise spectrum contribution by a suspected offender line may be obtained by collecting reported noise spectrum data and/or estimated noise spectrum data from potential victim lines. Also, where such direct evidence is not available, or in addition to it, other operational data showing crosstalk interference relating to potential victim lines can be used. The transmitting modem can either be on the CO/RT side or on the CPE side. Modems other than suspected offenders might transmit zero or minimal power in one or more selected frequency bands during scanning to reduce the risk that a modem and/or line not being examined for "offender" status supplies unnecessarily complicating and/or dominant crosstalk during the procedure. For DMT modulated DSL transceivers, well designed transmit spectra can be easily enforced by manipulating line profiles where such well designed line profiles cause minimal or no interruption to existing DSL customers. The invention also can be used to identify (partially or fully) the absolute values of crosstalk channels making up a channel transfer function.

15 Claims, 8 Drawing Sheets

U.S. PATENT DOCUMENTS

| | | | |
|---|---|---|---|
| 5,479,447 | A | 12/1995 | Chow et al. |
| 5,511,119 | A | 4/1996 | Lechleider |
| 5,621,768 | A | 4/1997 | Lechleider |
| 5,901,205 | A | 5/1999 | Smith et al. |
| 6,075,821 | A | 6/2000 | Kao et al. |
| 6,134,274 | A | 10/2000 | Sankaranarayanan et al. |
| 6,147,963 | A | 11/2000 | Walker et al. |
| 6,393,052 | B2 | 5/2002 | Sadjadpour et al. |
| 6,507,608 | B1 | 1/2003 | Norrell |
| 6,597,745 | B1 | 7/2003 | Dowling |
| 6,636,603 | B1 | 10/2003 | Milbrandt |
| 6,744,811 | B1 | 6/2004 | Kantschuk |
| 6,870,901 | B1 | 3/2005 | Gudmundsson et al. |
| 6,940,973 | B1 | 9/2005 | Yeap et al. |
| 6,970,415 | B1 | 11/2005 | Galarza et al. |
| 6,970,560 | B1 | 11/2005 | Hench et al. |
| 6,978,015 | B1 | 12/2005 | Erickson et al. |
| 6,990,196 | B2 | 1/2006 | Zeng et al. |
| 7,016,822 | B2 * | 3/2006 | Bosley et al. ............... 703/2 |
| 2002/0044610 | A1 | 4/2002 | Jones |
| 2002/0094428 | A1 | 7/2002 | Nomura et al. |
| 2002/0138811 | A1 | 9/2002 | Bosley et al. |
| 2003/0072380 | A1 | 4/2003 | Huang |
| 2003/0086362 | A1 | 5/2003 | Hasegawa et al. |
| 2003/0086514 | A1 | 5/2003 | Ginis et al. |
| 2003/0235245 | A1 | 12/2003 | Erdogan et al. |
| 2004/0086064 | A1 | 5/2004 | Van Acker et al. |
| 2004/0095921 | A1 * | 5/2004 | Kerpez ............... 370/351 |
| 2004/0109546 | A1 | 6/2004 | Fishman |
| 2005/0047323 | A1 | 3/2005 | Clarkson et al. |
| 2005/0052988 | A1 | 3/2005 | Tsatsanis et al. |
| 2005/0053229 | A1 | 3/2005 | Tsatsanis et al. |
| 2005/0123028 | A1 | 6/2005 | Cioffi et al. |
| 2005/0129218 | A1 | 6/2005 | Kimble et al. |
| 2005/0152385 | A1 | 7/2005 | Cioffi |
| 2005/0175078 | A1 | 8/2005 | Redfern |
| 2005/0195892 | A1 | 9/2005 | Ginis et al. |
| 2005/0220179 | A1 | 10/2005 | Tsatsanis |
| 2005/0281229 | A1 | 12/2005 | Girola et al. |
| 2006/0029147 | A1 | 2/2006 | Tsatsanis |
| 2006/0029148 | A1 * | 2/2006 | Tsatsanis ............... 375/267 |
| 2006/0056522 | A1 | 3/2006 | Tsatsanis et al. |
| 2006/0109779 | A1 | 5/2006 | Shah et al. |
| 2006/0133519 | A1 | 6/2006 | Tsatsanis et al. |
| 2006/0146945 | A1 | 7/2006 | Chow et al. |
| 2006/0153106 | A1 * | 7/2006 | Laakso et al. ............... 370/282 |
| 2006/0159232 | A1 | 7/2006 | Jiang et al. |
| 2009/0207985 | A1 | 8/2009 | Cioffi et al. |

FOREIGN PATENT DOCUMENTS

| | | |
|---|---|---|
| DE | 4444312 | 2/1996 |
| EP | 1207665 | 5/2002 |
| GB | 2315392 | 1/1998 |
| WO | WO-95/31867 | 11/1995 |
| WO | WO-01/35611 | 5/2001 |
| WO | WO-2004006492 | 1/2004 |
| WO | WO-2004/027579 | 4/2004 |
| WO | WO-2005/034459 | 4/2005 |
| WO | WO-2005094052 | 10/2005 |
| WO | WO2005114924 | 12/2005 |

OTHER PUBLICATIONS

Patent Cooperation Treaty, International Preliminary Report on Patentability and Written Opinion, PCT Application No. PCT/US2007/013393, (Dec. 24, 2008) 8 pages.

International Search Report, International Application No. PCT/IB2006/000836 (5 pgs).

Written Opinion of the International Searching Authority, International Application No. PCT/IB2006/000836 (8 pgs).

Papandreou et al., "Real-Time FEXT Crosstalk Identification in ADSL Systems," Intelligent Signal Processing, 2003 IEEE International Symposium; Sep. 4, 2003, XP-10688401 (6 pgs).

Papandreou, Nikos, et al., "Real-time FEXT Crosstalk Identification in ADSL Systems", *2003 International Symposium on Intelligent Signal Processing—WISP 2003*, Budapest, Hungary, (Sep. 2003).

"Physical Layer Management for Digital Subscriber Line (DSL)", ITU—Telecommunication Standardization Sector; Geneva, Switzerland; XP-017401258; 45 pgs., (May 2003), 1-45.

"Physical Layer Management for Digital Subscriber Line (DSL)", ITU—Telecommunication Standardization Sector; Geneva, Switzerland; XP-017401258; 44 pgs., (May 2003), 46-89.

Campello, "Practical Bit Loading for DMT", ICC '99, 1999 IEEE International Conference on Communications; Conference Record; Vancouver, Canada., XP-000897971, (Jun. 6, 1999), 5 pgs.

Cendrillon, R , et al., "Improved Linear Crosstalk Precompensation for DSL", Acoustics, Speech and Signal Processing, 2004. Piscataway, NJ, US, vol. 4., (May 17, 2004), pp. 1053-1056.

Cendrillon, Raphael , et al., "Partial Crosstalk Cancellation Exploiting Line and Tone Selection in VDSL", (Sep. 2003).

Cendrillon, et al., "Partial Crosstalk Cancellation for Upstream VDSL", EURASIP Journal on Applied Signal Processing, (Oct. 2004), 16 pgs.

Cendrillon, et al., "Partial Crosstalk Precompensation for Downstream VDSL", Published by Elsevier North-Holland, Inc.; vol. 84 issue 11; ISSN:0165-1684, (Nov. 2004), 15 pgs.

Cendrillon, et al., "The Linear Zero-Forcing Crosstalk Canceller is Near-optimal in DSL Channels", IEEE Global Communications Conference (Globalcom); Dallas; Texas., (Dec. 2004), 5 pgs.

Cheong, Minho , et al., "Computationally Efficient Cancellation of Partially-overlapped Crosstalk in Digital Subscriber Lines", Globalcom 2005; St. Louis, Missouri; Nov. 28-Dec. 2., (2005), 5 pgs.

Cioffi, John M., et al., "Canonical Packet Transmission on the ISI Channel with Guassian Noise", Global Telecommunications Conference; London, UK., XP-010220148, (Nov. 18, 1996), 1405-1410.

Cioffi, John M., et al., "Dynamic Spectrum Management", A methodology for providing significantly higher broadband capacity to the users, Telektronikk, (Apr. 2004), 12 pgs.

Cioffi, John M., "Dynamic Spectrum Management Report", Broadband World Forum; London, England., (Sep. 10, 2003).

Cioffi, John M., "Dynamic Spectrum Management Report", Committee T1—Telecommunications Working Group NAI, San Francisco, California, (Feb. 21, 2005), 75 pgs.

Cioffi, John , et al., "MIMO Channel Measurement Test Plan", (Feb. 17, 2003).

Cioffi, John M., "Spectrum Management with Advancing DSLs".

Cioffi, John , "The Fast Adaptive Rotor's RLS Algorithm", IEEE Transactions on Acoustics, Speech and Signal Processing, New York, NY, US vol. 38, No. 4, (Apr. 1, 1990), pp. 631-653.

Cioffi, John , et al., "Vectored VDSL (99-559)", (Dec. 5, 1999).

Cuypers, et al., "Combined per tone equalization and receiver windowing in DSL receivers: WiPTEQ", Elsevier Science Publishers, Amsterdam, NL, vol. 85, No. 10, (Oct. 2005), pp. 1921-1942.

Cuypers, et al., "Combining Per Tone equalization and windowing in DMT receivers", IEEE International Conference on Acoustics, Speech and Signal Processing (ICASSP); Orlando, Florida., (Sep. 2002).

Fang, Jeannie L., "Modeling and Characterization of Copper Access Systems", (May 31, 2002).

Fischer, "Appendix E of "Precoding and Signal Shaping for Digital Transmission"", Wiley-IEEE Press, ISBN: 978-0-471-22410-5, (Aug. 2002), 10 pgs.

Forouzan, et al., "Generalized Iterative Spectrum Balancing and Grouped Vectoring for Maximal Throughput of Digital Subscriber Lines", Globalcom 2005; St. Louis, Missouri., (Dec. 2, 2005), 5 pgs.

Ginis, George , et al., "A Multiuser precoding scheme achieving crosstalk cancellation with application to DSL systems", Signals, Systems, and Computers, 200. IEEE vol. 2., (Oct. 29, 2000), pp. 1627-1631.

Ginis, George , et al., "Alien Crosstalk Cancellation for Multipair Digital Subscriber Line Systems", vol. 2006 Article ID 16828, (2006).

Ginis, George , et al., "Blind adaptive MIMO decision feedback equalization using givens rotations", IEEE International Conference on Communications, New York, NY, US, vol. 1 of 5., (Apr. 28, 2002), pp. 59-63.

Harashima, et al., "Matched-transmission technique for channels with intersymbol interference", IEEE Transactions on Communication; vol. COM-20, No. 4, (Aug. 1972), 774-780.

Ilani, Ishai, "Crosstalk Cancellation for Multi-Line G.shdsl Systems", (Aug. 19, 2002).
Im, Gi-Hong, et al., "FEXT Cancellation for Multi-Carrier Transmission System", (Apr. 11, 2002).
Laroia, et al., "A Simple and Effective Precoding Scheme for Noise Whitening in Intersymbol Inference Channels", IEEE Trans. on Communication; vol. 41, (Oct. 1993), 1460-1463.
Lee, et al., "Binder MIMO Channels", submitted to IEEE Journal on Selected Areas in Communications, Reference No. XP-001143167, (Jun. 2002), 20 pgs.
Louveaux, J., et al., "Downstream VDSL channel tracking using limited feedback for crosstalk precompensated schemes", Acoustics, Speech and Signal Processing, 2005, (Mar. 18, 2005), pp. 337-340.
Magesacher, et al., "Exploiting the Common-Mode Signal in xDSL", Proc. 12th European Signal Processing Conference (EUSIPCO 2004), Vienna, Austria, Sep. 7-10, 2004., 4 pgs.
Otte, M, et al., "Complex CORDIC-like algorithms for linearly constrained MVDR beamforming", Broadband Communications, 2000. Piscataway, NJ, US., (Feb. 15, 2000), pp. 97-104.
Panigrahi, Saswat, et al., "Fine-Granularity Loading Schemes using Adaptive Reed-Solomon Coding for Discrete Multitone Modulation Systems", IEEE (2005), 5 pgs.
Papandreou, Nikolaos, "Cooperative Bit-Loading and Fairness Bandwidth Allocation in ADSL Systems", IEEE (2003), 4 pgs.
Papandreou, Nikolaos, et al., "Real Time FEXT Crosstalk Identification in ADSL Systems", Real Time FEXT Crosstalk Identification in ADSL Systems, WISP 2203, Budapest, Hungary, Sep. 4-6, 2003., (Sep. 4, 2003), 6 pgs.
Paul, Clayton R., "Analysis of Multiconductor Transmission Lines", John Wiley & Sons, Chapters 2 and 3, (1994), 46-186.
Song, Kee Bong, et al., "Dynamic Spectrum Management for Next-Generation DSL Systems", IEEE Communications Magazine; Reference No. XP-001132769, (Oct. 2002), 9 pgs.
Song, et al., "Dynamic Spectrum Management for Next-Generation DSL Systems", IEEE Communications Magazine, XP-002395021, (Oct. 2002), 101-109.
Starr, et al., "DSL Advances", Chapters 3, 7, and 11; Prentice-Hall, (2003).
Tomlinson, "New Automatic Equaliser Employing Modulo Arithmetic", Electr. Letters; vol. 7., (Mar. 1971), 138-139.
Voyan Technology, "Vectoring Techniques for Multi-Line 10MDSL Systems", (Aug. 2002).
Wei, "Generalized Square and Hexagonal Constellations for Intersymbol-Interference Channels with Generalized Tomlinson-Harashima Precoders", IEEE Transactions on Communications, vol. 42, No. 9, (Sep. 1994), 9 pgs.
Yu, et al., "Distributed Muitiuser Power Control for Digital Subscriber Lines", IEEE Journal on Selected Areas in Communications; IEEE Service Center, Piscataway, US; vol. 20, No, 5; ISSN: 0733-8716. Reference No. XP-011065508, (Jun. 2002), 11 pgs.
European Patent Office, "Examination Report", European Application No. 07795837.9, (Apr. 1, 2009).
European Patent Office, "Examination Report", European Application No., (Mar. 3, 2009).
"International Search Report and Written Opinion", PCT Application No. PCT/IB2006/000744, (Aug. 31, 2006) 11 pgs.
"International Search Report and Written Opinion," PCT Application No. PCT/IB2005/00482, (May 18, 2006), 9 pgs.
"International Search Report and Written Opinion," PCT Application No. PCT/IB2006/000499, (Jun. 9, 2006), 12 pgs.
"International Search Report and Written Opinion," PCT Application No. PCT/IB2006/000759, (Aug. 16, 2006), 16 pgs.
"International Search Report and Written Opinion," PCT Application No. PCT/IB2006/000884, (Sep. 4, 2006) 6 pgs.
"International Search Report and Written Opinion", PCT Application No. PCT/IB2006/000645, (Aug. 4, 2006), 15 pgs.
"International Search Report and Written Opinion", PCT Application No. PCT/IB2006/000630, (Aug. 8, 2006), 12 pgs.
Official Action for Australian Patent Application No. 2006245450 mailed Feb. 19, 2010, whole document.
Non-Final Office Action for China Patent Application No. 200680020929.4, Mailed Feb. 12, 2010, 20 pages.
Non-Final Office Action for China Patent Application No. 200680020929.4, Mailed Feb. 12, 2010, 26 pgs.
Non-Final Office Action for China Application No. 200780021083.0 Mailed Apr. 1, 2010, 10 pgs.
Non-Final Office Action for China Patent Application No. 200680020929.4, Mailed Sep. 14, 2010, 26 pgs.
Third Office Action for Chinese Patent Application No. 200680020929.4, Mailed Mar. 2, 2011, 9 pages.
Office Action for Application No. 2008-510657 dated Aug. 16, 2011, 4 pages.
European Search Report for Application No. 11161331.1 dated May 19, 2011, 6 pages.

* cited by examiner

BINDER IDENTIFICATION

CROSS-REFERENCE TO RELATED APPLICATIONS

This application claims the benefit of priority under 35 U.S.C. §119(e) of the following:

U.S. Provisional No. 60/679,508 filed on May 10, 2005, entitled BINDER IDENTIFICATION, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (twisted pairs of wires that are also may be referred to as loops and/or the copper plant). DSL systems can adjust to the characteristics of the subscriber line by using a discrete multitone (DMT) line code that assigns a number of bits to each tone (or sub-carrier), which can be adjusted to channel conditions determined during training/initialization of the modems (typically transceivers that function as both transmitters and receivers) at each end of the loop.

The performance of DSL systems is very often limited by the effects of crosstalk noise at the DSL receivers. Such crosstalk noise originates from sources that may include other DSL systems, or other systems whose signals are coupled on the twisted pairs used by DSL systems. Crosstalk noise is particularly strong when twisted pairs are physically close, such as when they share a common binder. Knowledge of crosstalk effects is very useful for DSL management operations, because it helps with identifying the cause of poor performance, and because it can lead to steps to correct the crosstalk problem.

Systems, apparatus, methods and techniques that provide improvements for performing identification of crosstalk within the twisted pairs of a binder or other group of communication lines would represent a significant advancement in the art. Also, systems, apparatus, methods and techniques for implementing such binder identification that can identify the crosstalk "victims" and the crosstalk "offenders" likewise would represent a significant advancement in the art.

BRIEF SUMMARY

Embodiments of the present invention provide methods, techniques and apparatus for identifying members and characteristics of groups of DSL lines. Information obtained using the present invention includes the identification of significant crosstalking "offenders" and their affected "victims" and can be found using scanning (for example, collecting operational data in connection with use of one or more line profiles).

Embodiments of the present invention are helpful in DSL systems where multiple telephone lines in a binder offer DSL services. Such lines typically create near end crosstalk (NEXT) and far end crosstalk (FEXT) that can become dominant impairments to other lines in the same binder. Methods according to embodiments of the present invention include instructing one or a small number of modems to transmit with preselected transmit spectra, then examining crosstalk evidence in the noise spectrum data of one or more potential victim lines. Direct evidence of noise spectrum contribution by a suspected offender line may be obtained by collecting reported and/or estimated noise spectrum data from potential victim lines. Also, where direct evidence is unavailable, or in addition to it, other operational data showing crosstalk interference relating to potential victim lines can be used (for example, bit distribution data). The transmitting modem can either be on the CO/RT side or on the CPE side. Modems other than the suspected offender(s) might transmit zero or minimal power in one or more selected frequency bands during scanning to reduce the risk that a modem and/or line not being examined for "offender" status supplies crosstalk during the procedure. For DMT modulated DSL transceivers, well designed transmit spectra can be enforced by manipulating line profiles where such line profiles cause minimal or no interruption to existing DSL users. The invention also can identify (partially or fully) absolute values of crosstalk channels making up a channel transfer function.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
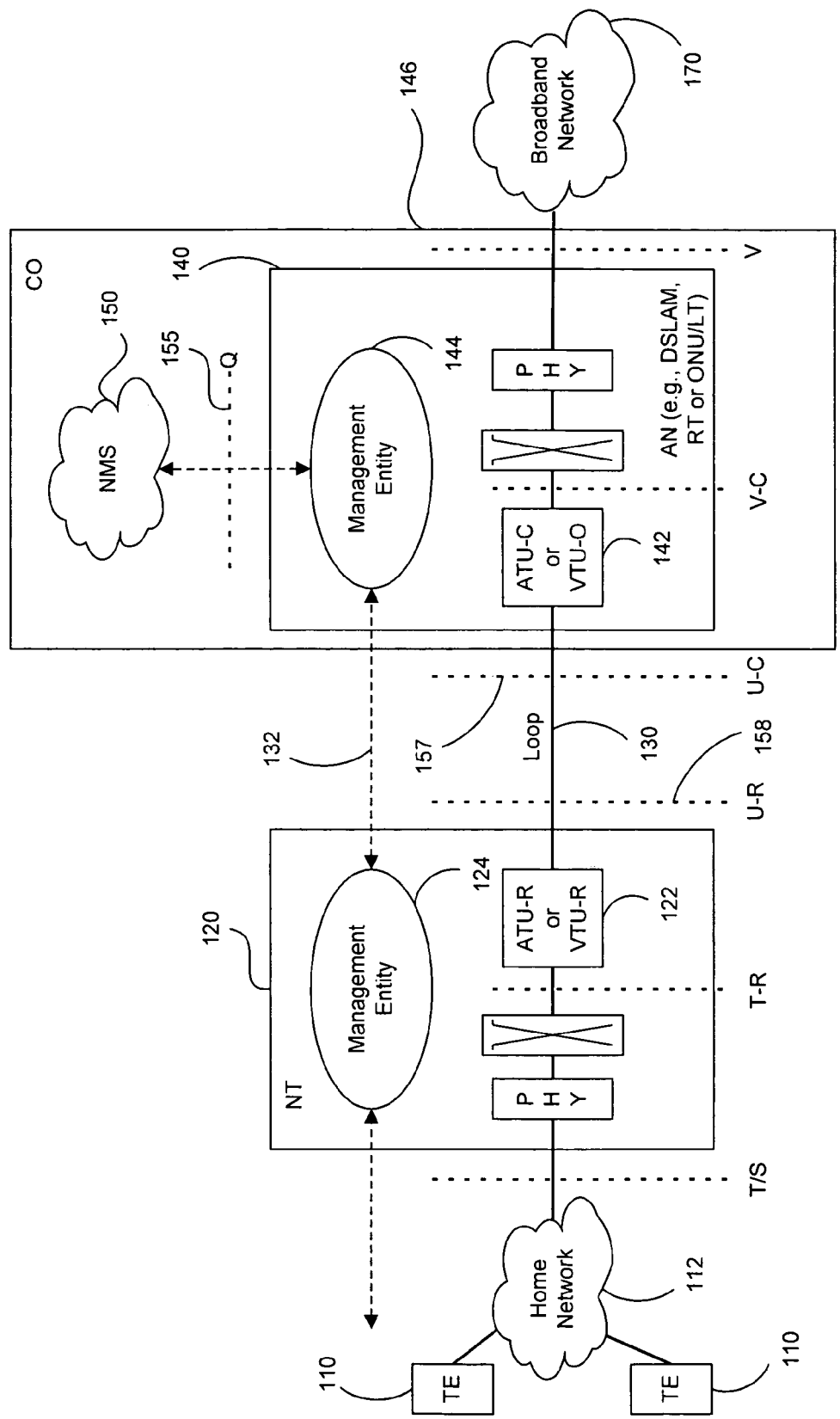
FIG. 1 is a schematic block reference model DSL system.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention implement methods, techniques and apparatus that permit identification of various members and/or characteristics of groups of communication lines, including telephone lines used for DSL services in one or more binders. The communication system in which embodiments of the present invention may be used may include ADSL lines, VDSL lines and/or or any other communication system components and/or lines with which the present invention is practical, as will be appreciated by those skilled in the art after reading the present disclosure.

In the disclosure presented herein, examples for identifying binder members (for example, telephone lines in the same binder), offenders, victims and absolute values of crosstalk transfer functions are provided in connection with DSL systems and the like. The information learned and/or identified can be used to control one or more aspects and/or members of the communication system in various ways. The present invention extends beyond DSL systems alone and may be used in connection with any communication system in which identification of lines is helpful and can be conducted in a manner consistent with the present invention.

A controller, such as a DSL optimizer, dynamic spectrum management center (DSM Center), a "smart" modem and/or computer system (including an integrated circuit, or "IC") can be used to collect and analyze the operational data and/or performance parameter values as described in connection with the various embodiments of the present invention. Such a controller also can be used to implement the methods and techniques of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will be used in connection with one-sided or two-sided vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication and/or data transmission services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol" from the DSL Forum, dated May 2004. Finally, DSL Forum Technical Report TR-064, entitled "LAN-Side DSL CPE Configuration Specification" from the DSL Forum, dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the discussion of DSL systems generally may be extended to ADSL, also, because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
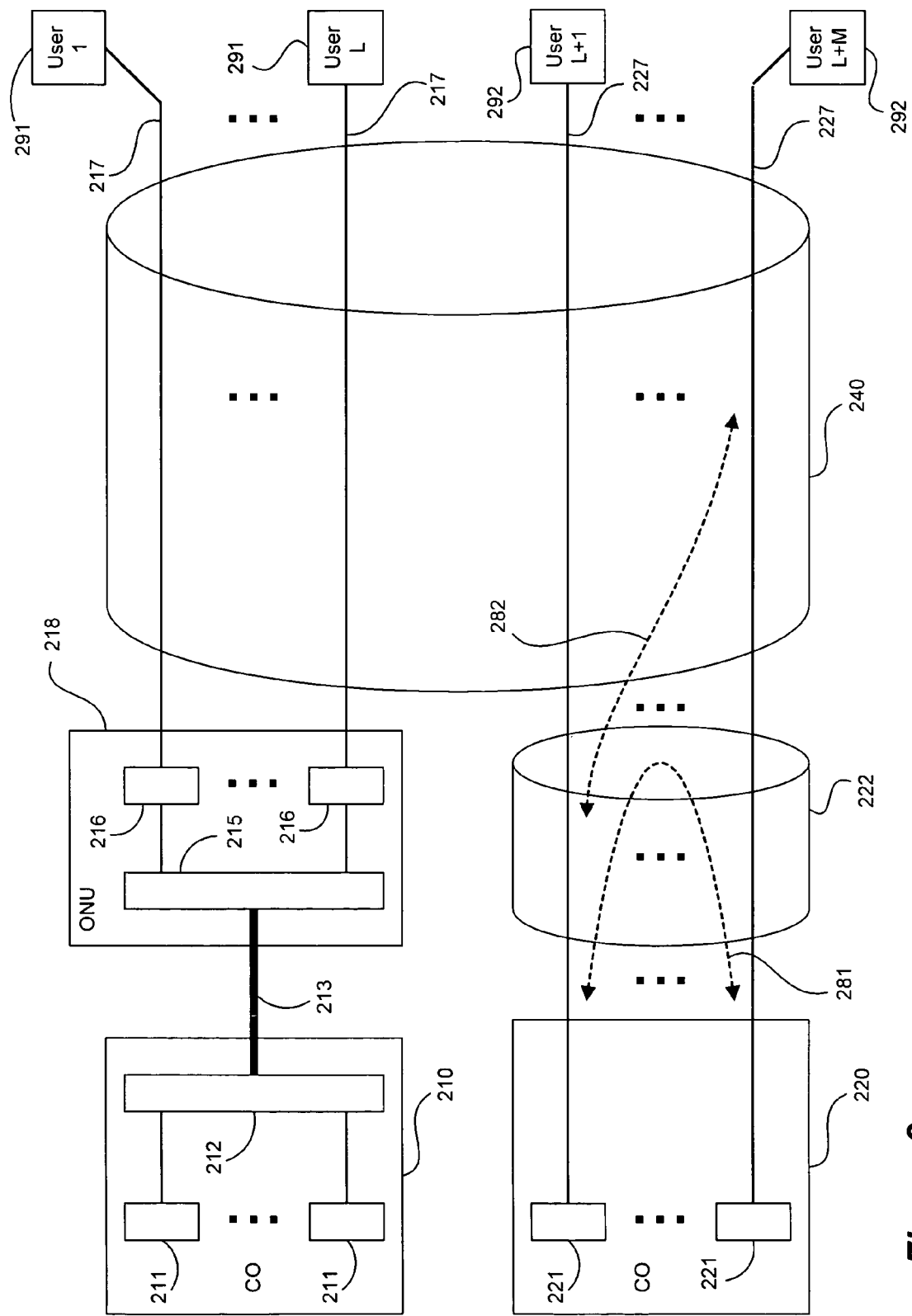
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

A typical binder in a telephone network consists of 25 to 100 pairs of copper twisted wire pairs. When multiple lines in a binder offer DSL services, the lines can create NEXT and FEXT that potentially become dominant impairments to signals sent on other DSL lines in the same binder. In current DSL systems without vectoring or other line coordination, it has been very difficult or impossible to identify the exact channel transfer function of the crosstalk channels, and thus it was believed to be very difficult or impossible to identify an "offender" (that is, a line that creates significant crosstalk), and each "victim" (a line that suffers from the crosstalk).

Embodiments of the present invention include methods for identifying offenders and victims in conjunction with scanning. "Scanning" is the process of using one or more line profiles with one or more trainings and data collections for the purpose of collecting informative operational data. Some of these methods consist of first instructing one or a small number of modems to transmit with preselected transmit spectra, and then examining the noise spectrum reported by candidate victim modems, as reflected in collected operational data. The transmitting modem can either be on the upstream end CO/RT side or on the downstream end CPE side. Modems other than the suspected offender(s) might be forced to transmit zero or minimal power in one or more selected frequency bands during scanning to reduce the risk that a modem and/or line not being examined for "offender" status supplies unnecessarily complicating and/or dominant crosstalk during the procedure.

For DMT modulated DSL transceivers, well designed transmit spectra can be enforced by manipulating line profiles, where well designed line profiles usually cause minimal or no interruption to existing DSL customers. The invention also can be used to identify (partially or fully) the absolute values of a crosstalk channel making up a channel transfer function.

The following illustrative explanation will use telephone lines co-terminating in a telephone service operator's facility or device, though the present invention is not limited only to the illustrative situations presented herein. An operator's database can be examined initially to identify a set of lines that are potentially operating in the same binder. For example, all lines connected to a common central office (CO) (including the lines connected through remote terminals (RT) that are eventually connected to the same CO) might be declared as candidates for inspection of potential offender-victim relationships. In other cases, customers with addresses that are physically proximate can be considered as a set of candidates. This selected set of lines can be designated S.

Figure 3A:
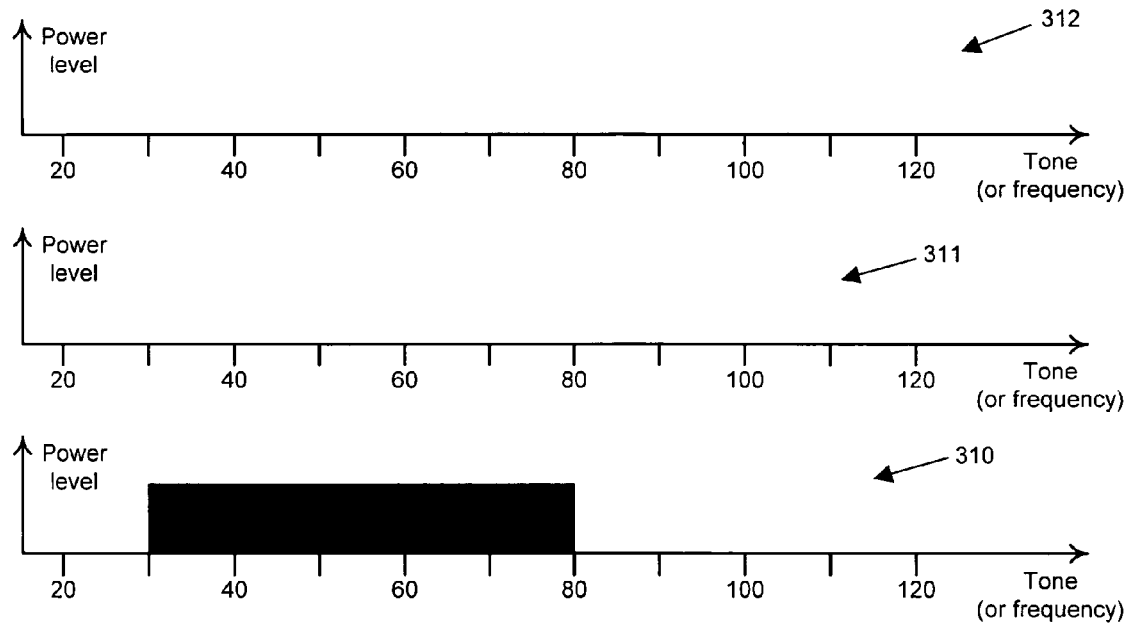
FIGS. 3A, 3B, 3C, 3D are exemplary transmit spectra that can be used with embodiments of the present invention.
Figure 3B:
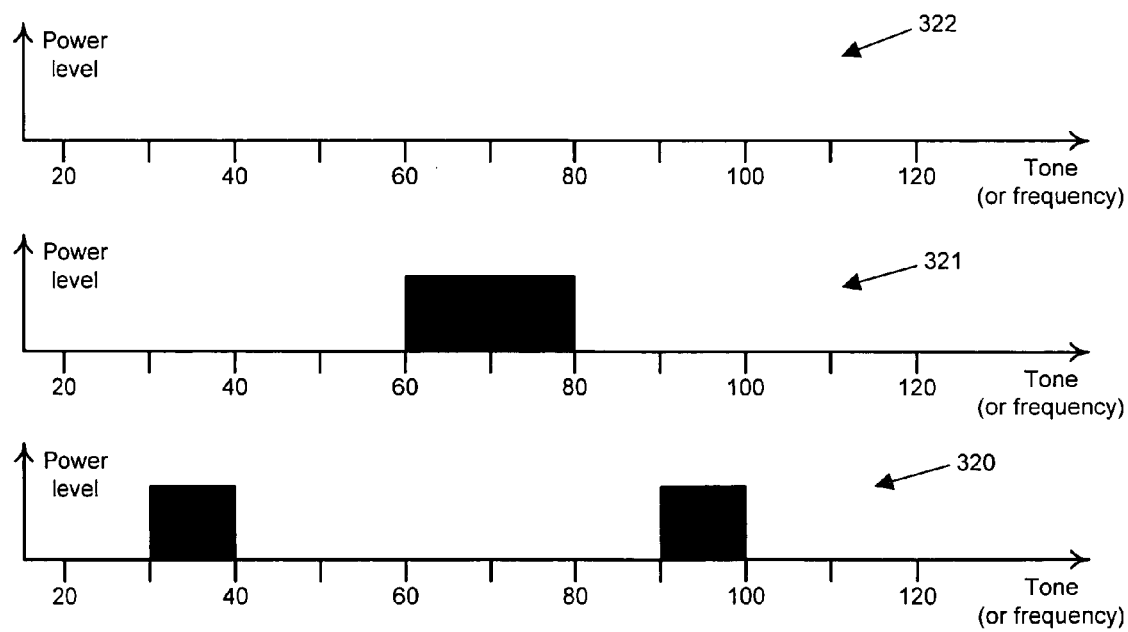

One DSL line is chosen as the potential offender. The modem attached to the chosen line is retrained, being instructed to use a line profile having a distinct carrier mask or PSDMASK, which will result in a distinct transmit spectrum. Four examples of such masks (which, for example, can be carrier and/or PSD masks) are shown in FIGS. 3A-3D. In FIG. 3A, a simple PSDMASK spectrum is used for the transmit spectra of a suspected offender line 310, while other suspected offender lines 311, 312 may remain silent. Generally, the potential victims should not be silent. For ADSL1, for example, there is no way to estimate a victim line's noise spectrum if it does not load any bits. The goal is to be able to isolate and identify a suspected offender line's crosstalk in each potential victim line. In another example shown in FIG. 3B, a first suspected offender line 320 uses a first PSDMASK spectrum while a second suspected offender line 321 uses a second PSDMASK spectrum. Again, potential offender lines other than 320 and 321, such as line 322, may remain silent. Although 2 different suspected offender lines are transmitting, they are using carriers that do not overlap.

Figure 3C:
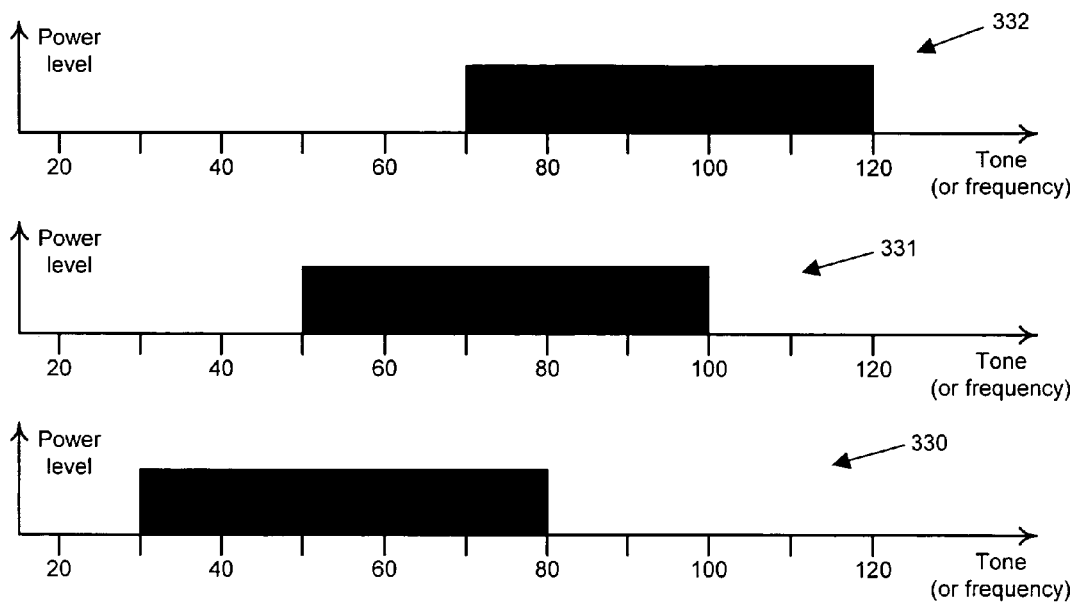
Figure 3D:
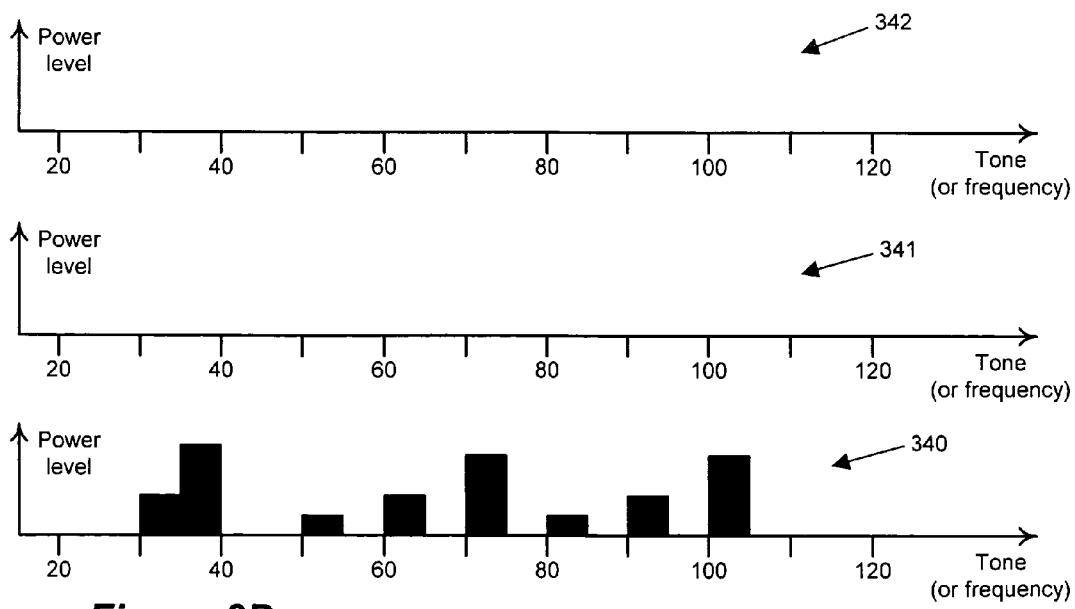

In FIG. 3C, the carriers of the suspected offender lines 330, 331 and 332 overlap, but they are readily distinguishable. For the examples in FIGS. 3A, 3B and 3C, carrier masks may be used instead of PSD masks because the power level is the same for all usable tones of each line profile. Finally, in FIG. 3D, the suspected offender line 340 uses a PSDMASK that allows different power levels on different tones to assist in distinguishing its spectrum as crosstalk in potential victim lines while other potential offender lines 341 and 342 may remain silent. In these situations, carrier masks or PSD masks that are not normally used would be especially helpful (that is, opposed to those that typically might arise under applicable standards and/or modem manufacturers' practices). Carrier masks or PSD masks that are not likely to occur "naturally" during normal operation of an DSL system thus can be useful for such crosstalk identification.

A set of potentially offending modems (which may be a single modem, or may be more than one modem, according to some embodiments of the present invention, as discussed in more detail below) starts transmitting. Where the potential offender set is a single modem, that modem transmits with the chosen line profile. The noise spectrum (that is, crosstalk) is measured from all the other transceivers in the designated set S. The noise spectra may be directly available from the DSL modems in set S, or may need to be estimated from other operational data such as bit distribution, margin, transmit power, etc.

Direct evidence of noise spectrum effects can include, for example, actual spectrum data reported in dBm/Hz for each tone (for example, as in ADSL2). In the ITU-T PLOAM recommendation (G.997.1), "Quiet Line Noise PSD per subcarrier" is required to be reported. Where these direct measurement parameters are not available, direct evidence of noise spectrum effects might require estimation of the noise spectrum of one or more potential victim lines. For example, channel characteristics per subcarrier and/or SNR per subcarrier data might be available and be used in estimating a potential victim line's noise spectrum. In many cases, neither the direct noise spectrum parameters nor the data used in estimating a potential victim line's noise spectrum will be available. In such cases, indirect evidence of a potential victim line's noise spectrum can be used instead. For example, bit distribution, margin, transmit power, attenuation, etc. can be used for estimating a line's noise spectrum.

After collecting any observed and/or estimated noise spectra and/or other operational data from the potential victim lines, the set of noise spectra is examined and searched for any correlation between the received noise spectrum pattern or bit distribution pattern and the transmit power pattern of any potential offender's transmit spectrum. Well designed CARMASKs or PSDMASKs will allow differentiation of the noise spectra from any observable and known noise spectra such as noise spectra that correspond to AM noise ingress, ISDN, HDSL, etc. Alternatively, one might look for a change in the shape of a noise spectrum, or for a change in the maximum attainable data rate, etc. after the distinct carrier mask is used by a potentially offending modem. If any match, correlation and/or change is found, then the line on which the crosstalk is found can be declared as a victim immediately or examined further for confirmation. As will be appreciated by those skilled in the art, there can be multiple victims for one offender.

In some cases, multiple offenders might exhibit equal, similar and/or comparable crosstalk power levels on victim lines, generating barely observable changes in noise spectrum or maximum attainable data rate should one offender only change CARMASK or PSDMASK. To isolate, distinguish and/or identify each offender's effect, a frequency band may be selected after which all the lines in set S transmit no or low power in the selected band. The potential offender line, on the other hand, can transmit a distinct power spectrum in the band, thus making identification of that offender's crosstalk to victim(s) more definite.

In addition to identifying offenders and victims in a given communication system, embodiments of the present invention can use the noise level and transmit power level (if known) to estimate the absolute value of the channel transfer function of the crosstalk channel. This crosstalk channel estimation is possible only for the tones with non-zero transmit power from the offender. However, after identification of an offender and victim(s), different transmit spectra (for example, a spectrum in which all tones are used with maximum power) can be used to identify the absolute value of channel transfer function for all tones. As will be appreciated by those skilled in the art, crosstalk channel estimation using these techniques will not be applicable for tones in which crosstalk is not the dominant noise source.

The techniques discussed above can be generalized, applied serially and/or applied in parallel to expedite identification. For example, 5 different line profiles with 5 distinct carrier mask patterns (for example, carrier masks implementing bands with no overlapping frequencies) can be used simultaneously on 5 different transceivers (potential offenders). Thereafter, the victims can be searched simultaneously. Alternatively, a few distinct carrier mask patterns may be used in various sequences so that different offenders can be identified. For instance, two distinct profiles A and B may be used by 8 potential offenders in the following sequences where each profile is used for one day.

|  | Day 1 | Day 2 | Day 3 |
|---|---|---|---|
| Potential offender 1: | A | A | A |
| Potential offender 2: | A | A | B |
| Potential offender 3: | A | B | A |
| Potential offender 4: | A | B | B |
| Potential offender 5: | B | A | A |
| Potential offender 6: | B | A | B |
| Potential offender 7: | B | B | A |
| Potential offender 8: | B | B | B |

In some DSL systems, line profiles with distinct CARMASKs or PSDMASKs might be used for normal operation. In such cases, offenders and victims might be identified solely based on normal operational data, or with additional data collected with a few special line profiles. In an operator's network, for instance, all the normal line profiles might have tones between 32 and 60 disabled for lines connected to RTs in an ADSL1 system (for example, all the RT lines are forced to yield these tones so that CO lines can be guaranteed a minimum data rate; CO lines have no tone restriction and thus these tones will be used by the CO lines). In such a case, the CO lines that are victims of the RT lines can be found (without requiring use of special line profiles) by searching for abrupt noise power changes above tone 60. Furthermore, one can design a special line profile for RT lines where the line profile enables tones 40~50. If only one RT line in set S is allowed to use this special line profile, all the victims of this particular RT line will then be found easily. Upon identification of an offender and victim(s), special profiles may be used to obtain more accurate absolute channel transfer function of crosstalk channel(s).

In some DSL systems, all line profiles used during normal operation might have the same CARMASK and PSDMASK. The transmit energy, however, is allocated by a bit and energy loading algorithm, and the algorithm can produce a wide variety of transmit spectrum shapes, depending on data rate, target SNR margin (TSNRM), maximum SNR margin (MAXSNRM), and other parameters besides CARMASK and PSDMASK. Therefore, when a line profile results in a transmit spectrum that creates a crosstalk spectrum that is sufficiently distinctive when compared to commonly observed noise or crosstalk spectrum, the invention herein can be used to find offender-victim relations. In other words, even line profiles normally used during operation can be employed in some embodiments of the present invention where they provide a sufficiently distinctive pattern that is visible in victim lines. Additionally, the noise spectrum measured (or estimated) at the victim line can be used to estimate the transmit spectrum of the offender line, in those cases when the transmit spectrum is not known.

Once the victims of one offender are found, it can be deduced that all the victims and the offender are in the same binder. Although it is possible that the outer pair in a binder could affect an adjacent outer pair in an adjacent, abutting binder, the crosstalk power would likely be smaller than the crosstalk from an adjacent pair in the same binder in such cases, particularly, if a binder has a grounded metal shield. Alternatively, a small number of binders may be considered together as a new binder. Therefore, lines in the same binder may be found simply and efficiently after examining a relatively small subset of lines as potential offenders. In fact, an implementing controller (for example, a DSL optimizer or DSM manger) may first find lines in the same binder by trying only a portion of lines as potential offenders, redefining set S only with the lines in the same binder, and then searching for exact offender-victim relationships in set S. This process can be extremely efficient compared to one in which S initially has thousands of lines, because the new S has only a small number of lines.

The methods also can be used during normal DSL operation for monitoring purposes. For example, in a CO/RT mixed situation, all of the operational profiles for RT lines can be operated with no power (or significantly lower power than neighboring tones) transmitted between tones 45 and 50. The data rate loss due to the restriction usually is very small or negligible (in cases where it is not, the range of tones can be adjusted to reduce and/or minimize such data rate loss). Noise spectrum of all CO lines may be monitored continuously to see if any RT line's spectrum induces major crosstalk into the CO lines.

Embodiments of the present invention can be used for any situation in which crosstalk exists. In particular, the present invention can be useful in identifying offenders and victims where the offenders are connected to an RT and the victims are connected to the CO.

Information on offender-victim relationships and the exact crosstalk channels can be used to control spectra and data rates of the lines (for example, data rate tradeoffs between offender and victim lines can be utilized). Moreover, exact provisioning which can increase and/or maximize an operator's revenue can be implemented. Furthermore, the binder information can be used to update an operator's loop configuration database, which often is incomplete and/or inaccurate. Also, the information can be used when a system is upgraded to a vectored DSL system, because vectoring requires exact information on the set of lines in a common binder.

In summary, embodiments of the present invention can be used to identify one or more offenders and victims in communication systems with crosstalk or other identifiable interference by identifying a set of lines in which potential offenders and victims are present, forcing potential offenders to transmit distinct and/or distinguishable spectra (for example, having distinct shapes), collecting and/or estimating noise spectra of potential victims, and searching for noise spectrum evidence (or change of noise spectrum) that is the result of an offender's transmit spectrum. In situations with multiple potential offenders, such multiple offenders can be assigned distinct transmit spectra (for example, spectra used "in parallel") and victims can be searched for simultaneously. Similarly, the multiple potential offenders can be assigned distinct sequences of distinct transmit spectra (for example, spectra used "serially") and victims again can be searched for simultaneously. Where normal operational transmit spectra with recognizable spectrum shapes are used, these can be potential offenders' transmit spectra.

Lines' common binder membership can be estimated using the discovered offender-victim relationships. Once these relationships are known, they can be used to estimate absolute values of crosstalk channel transfer functions based on the offenders' transmit spectra and victims' noise spectra. The offenders' transmit spectra can be modified to provide a more accurate estimation of crosstalk channels. Any of the information obtainable using embodiments of the present invention can be used by operators, controllers, etc. to update loop databases.

Binder identification methods for a binder with as many as 25 to 50 pairs may require a large amount of time and large sets of stored data. Binder identification methods can be enhanced by taking advantage of any available knowledge of the binder structure. Some examples of such binder structure include the following:

EXAMPLE 1

Given that 3-4 sources ("offenders") usually dominate crosstalk noise of a "victim" pair, it is not beneficial to continue crosstalk identification for those pairs for which 3-4 "offenders" have already been identified.

EXAMPLE 2

If the crosstalk channel from "offender" A to "victim" B has been identified, then the crosstalk channel from "offender" B to "victim" A is likely to be very similar.

Binder identification requires a victim line to perform noise measurements, which can then be used to estimate crosstalk from other lines. The accuracy of such measurements can be enhanced by setting the programmable-gain-amplifiers (PGA) of the receiver to the highest settings possible. This ensures that the external crosstalk noise is strong relative to internal receiver noise sources. Given that the PGA gains are usually chosen using algorithms that are implemented inside the modem, an indirect method to affect the PGA gains can include controlling the transmitted signal power. Thus, it is beneficial for the transmitted signal power at the victim line transmitter to be set low during noise measurements, so that the crosstalk can be identified with higher accuracy (that is, so that crosstalk is larger relative to the intended data signal). One way to control transmit power is to increase data rate or increase MAXSNRM for the victim pair's DSL system.

Various apparatus according to the present invention can implement one or more of the methods and/or techniques discussed above. According to one embodiment of the present invention shown in FIG. 4A, a binder configuration identification unit 400 may be part of an independent entity coupled to a DSL system, such as a controller 410 (for example, a device functioning as or with a DSL optimizer, DSM server, DSM Center or a dynamic spectrum manager) assisting users and/or one or more system operators or providers in operating and, perhaps, improving and/or optimizing use of the system, including implementation of binder identification techniques, methods and/or controls based thereon. (A DSL optimizer may also be referred to as a dynamic spectrum manager, Dynamic Spectrum Management Center, DSM Center, System Maintenance Center or SMC.) In some embodiments, the controller 410 may be in or part of an ILEC or CLEC operating a number of DSL lines from a CO or other location while in other embodiments the controller 410 is a completely independent entity. As seen from the dashed line 446 in FIG. 4A, the controller 410 may be in the CO 146 or may be external and independent of CO 146 and any company operating within the system. Moreover, controller 410 may be coupled to, communicating with and/or controlling DSL and/or other communication lines in multiple COs.

In some embodiments of the present invention, the controller 410 controls and/or communicates with a DSL system's suspected and/or specific binder or set of lines implementing DSL services, for example communicating with one or more transmitters and/or receivers. The DSL lines may be ADSL, VDSL and/or other communication lines in various combinations. The binder configuration identification unit 400 has access (directly or indirectly) to information and/or data regarding the various lines in the subject communication system and may be able to control certain aspects of those lines' operation. For example, the controller 410 and/or binder configuration identification unit 400 may instruct lines to implement specific transmit spectra, carrier masks, power levels, etc., and to do so in specific ways according to embodiments of the present invention. Also, the binder configuration identification unit 400 may enable and/or disable operation of a set of communication lines, as appropriate.

Figure 4A:
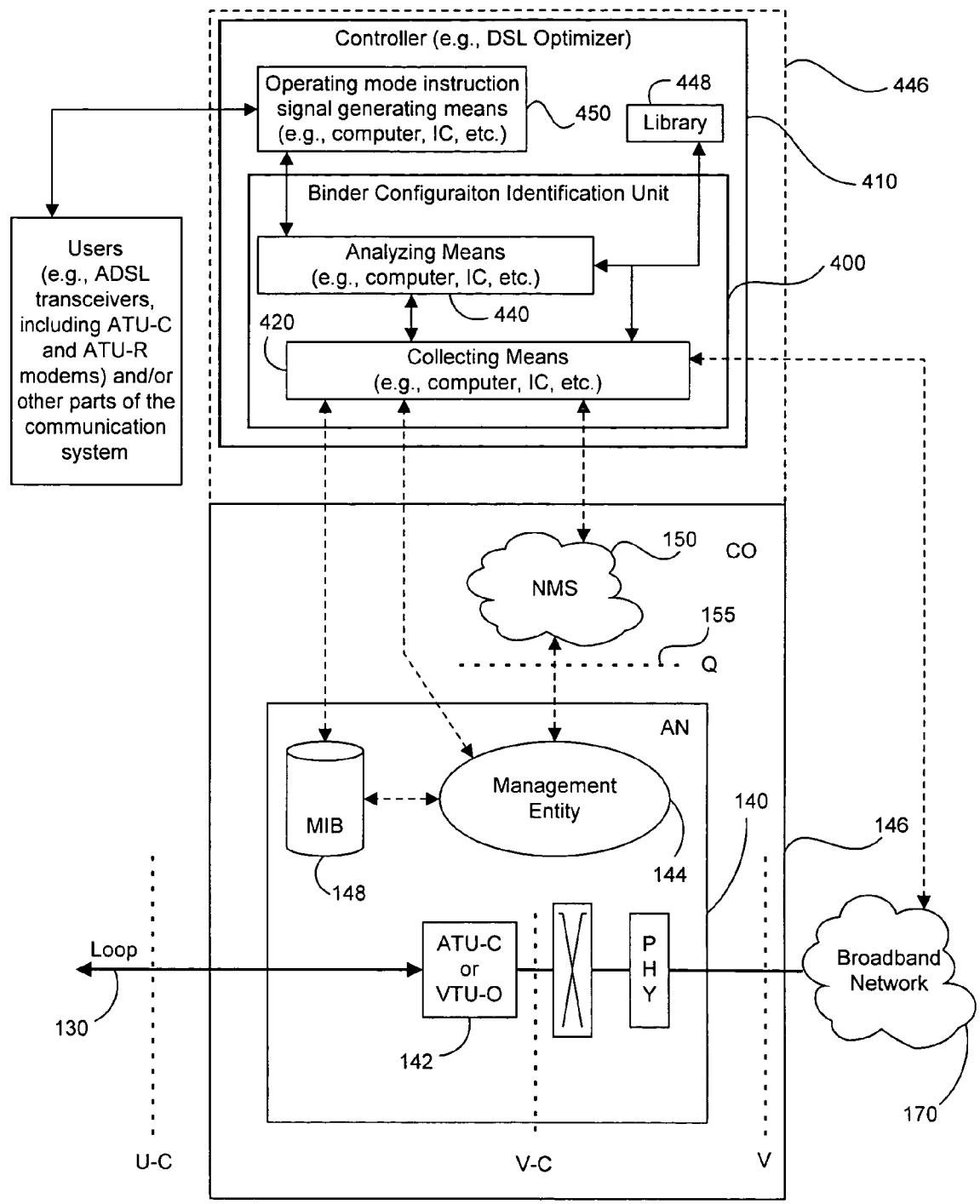
FIG. 4A is a controller and communication system implementing one or more embodiments of the present invention.

The binder configuration identification unit 400 includes a data collection unit 420 identified as a collecting means and an analysis unit 440 identified as analyzing means. As seen in FIG. 4A, the collecting means 420 (which can be a computer, a computer component, a computer system, processor, IC, IC-based system, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the binder configuration identification unit 400 to collect operational data from the system (for example, to be used in evaluating transmit spectra of transmitters, noise spectra of receivers, etc.). Data may be collected once or over time. In some cases, the collecting means 420 will collect on a periodic basis, though it also can collect data on-demand or any other non-periodic basis, thus allowing the binder configuration identification unit 400 to update its information, operation, etc., if desired.

In the exemplary system of FIG. 4A, the analyzing means 440 (which can be a computer, a computer component, a computer system, processor, IC, IC-based system, computer module, etc. of the type generally known) is coupled to a DSLAM, modem and/or system operating signal generating means 450, which may be inside or outside the controller 410. This signal generator 450 (which can be a computer, a computer component, a computer system, processor, IC, IC-based system, computer module, etc. of the type generally known) is configured to generate and send instruction signals to modems and/or other components of the communication system (for example, ADSL and/or VDSL transceivers and/or other equipment, components, etc. in the system). These instructions may include commands to implement various transmit spectra, to transmit signals in a manner designed to assist in executing one or more of the methods and/or techniques disclosed herein, to operate in a manner adjusted to use information obtained as a result of such methods and/or techniques, providing new and/or updated crosstalk information and matrices and/or any other operational characteristics of the relevant communication lines.

Embodiments of the present invention can utilize a memory, database, library or other collection of data pertaining to the data collected, past operation of the vectored DSL system and any other relevant lines and equipment. This collection of reference data may be stored, for example, as a library 448 in the controller 410 of FIG. 4A (or outside the controller 410, but available to it) and used by the analyzing means 440 and/or collecting means 420.

In various embodiments of the invention, the binder configuration identification unit 400 may be implemented in one or more computers such as PCs, workstations or the like. The collecting means 420 and analyzing means 440 may be software modules, hardware modules or a combination of both, as will be appreciated by those skilled in the art. When working with a large numbers of modems, databases may be introduced and used to manage the volume of data collected.

Figure 4B:
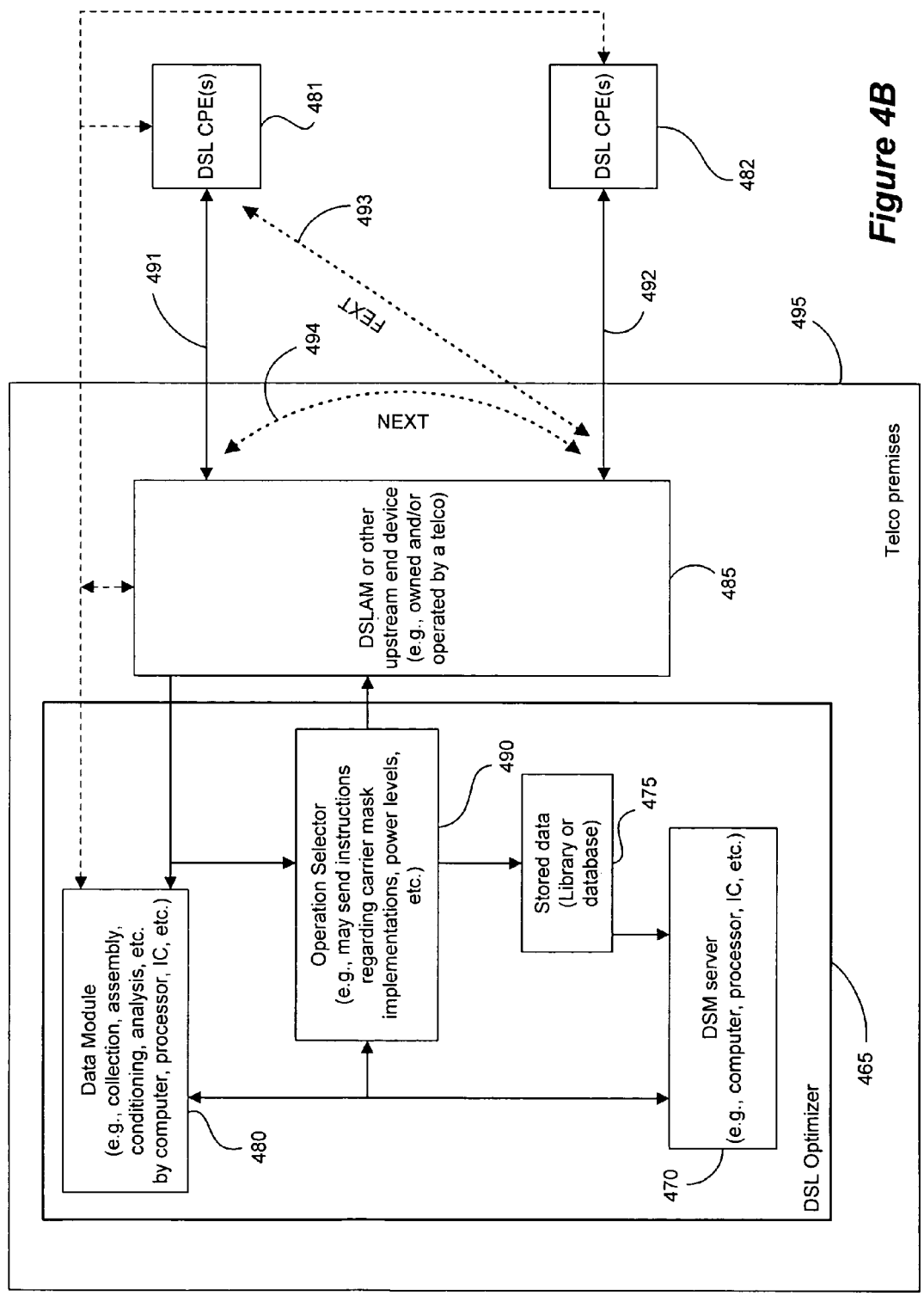
FIG. 4B is a DSL optimizer and communication system implementing one or more embodiments of the present invention.

Another embodiment of the present invention is shown in FIG. 4B. A DSL optimizer 465 operates on and/or in connection with a DSLAM 485 or other DSL system component, either or both of which may be on the premises 495 of a telecommunication company (a "telco"). The DSL optimizer 465 includes a data module 480, which can collect, assemble, condition, manipulate and supply operational data for and to the DSL optimizer 465. Module 480 can be implemented in one or more computers such as PCs or the like. Data from module 480 is supplied to a DSM server module 470 for analysis (for example, evaluating potential offenders, evaluating possible victims, controlling and/or ordering transmit spectra usage and power levels, evaluating noise spectra, calculating absolute values of crosstalk channels making up a channel transfer function, controlling a system based on the information obtained, etc.). Information also may be available from a library or database 475 that may be related or unrelated to the telco.

An operation selector 490 may be used to implement, modify and/or cease DSL and/or other communication operations, including implementation of various operational parameters involving transmit power, frequency bands, carrier masks, etc. Moreover, implementing embodiments of the present invention, selector 490 can send instructions regarding operation of potential offender and victim lines, operation of lines in a suspected binder relationship, etc. Decisions may be made and analysis conducted by the DSM server 470 or in any other suitable manner, as will be appreciated by those skilled in the art.

Operational modes and/or parameters selected by selector 490 can be implemented in the DSLAM 485, one or more upstream receivers, and/or any other appropriate DSL system or communication system component equipment. Such equipment may be coupled to remote DSL equipment such as customer premises equipment 499, whose lines 491, 492 may induce NEXT 494 and FEXT 493 in one another. The system of FIG. 4B can operate in ways analogous to the system of FIG. 4A, as will be appreciated by those skilled in the art, though differences are achievable while still implementing embodiments of the present invention.

Figure 5:
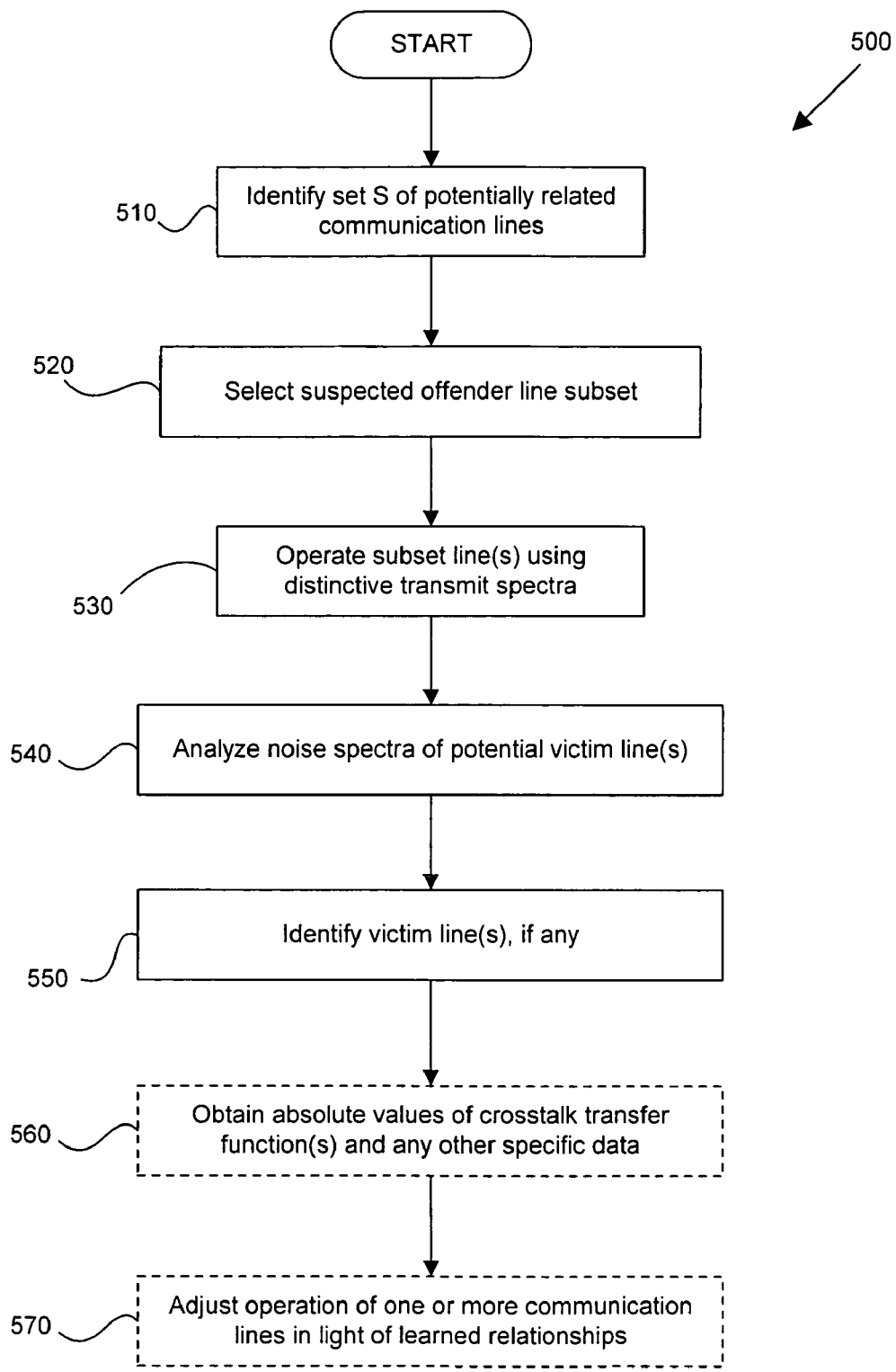
FIG. 5 is a flow diagram of a method according to one embodiment of the present invention.

A method 500 according to one embodiment of the present invention is shown in FIG. 5. At 510 a set of lines S is identified for consideration. This may be a set of lines that are suspected of being in the same binder or any other appropriate grouping. One or more potential offenders are selected at 520 as a subset of S and that subset is instructed at 530 to implement identifiable transmit techniques (for example, using one or more spectra such as a combination of tones easily spotted in the noise spectra of nearby lines affected by crosstalk from a suspected offender). The noise spectra of potential victim lines in the identified set are analyzed at 540. Those lines suffering significant crosstalk (for example, noise above a minimum threshold decibel level, any detectable crosstalk, etc.) are identified at 550 and can be designated as "victim" lines of the suspected, now confirmed, offender(s). At 560 measurements of the absolute values of crosstalk channels making up a channel transfer function optionally can be made to calculate the channel transfer function more fully. Additionally, at 570 adjustments optionally can be made to system operation, or alternatively to operation of an offender/victim grouping of lines to implement operational policies that reflect the information learned using method 500.

In the method 500 shown in FIG. 5, where multiple potential offenders are considered in the suspected offender line subset of S, these lines can be instructed at 530 to transmit using mutually and generally distinguishing transmit spectra. These identifying spectra may be mutually exclusive spectra that allow the various suspected offenders to transmit simultaneously without creating confusion as to which suspected offender is causing crosstalk in any other line. In another embodiment, the spectra transmitted at 530 are sequentially distinguishable, as discussed above. Analysis at 540 of any potential victims will require distinguishing between/among the various spectra used by the suspected offenders to determine which have generated crosstalk in victims' lines. Any various offender/victim(s) groupings can be further evaluated to obtain absolute values of crosstalk channels making up a channel transfer function at 560 and/or to implement controls at 570 reflecting information learned as a result of method 500.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
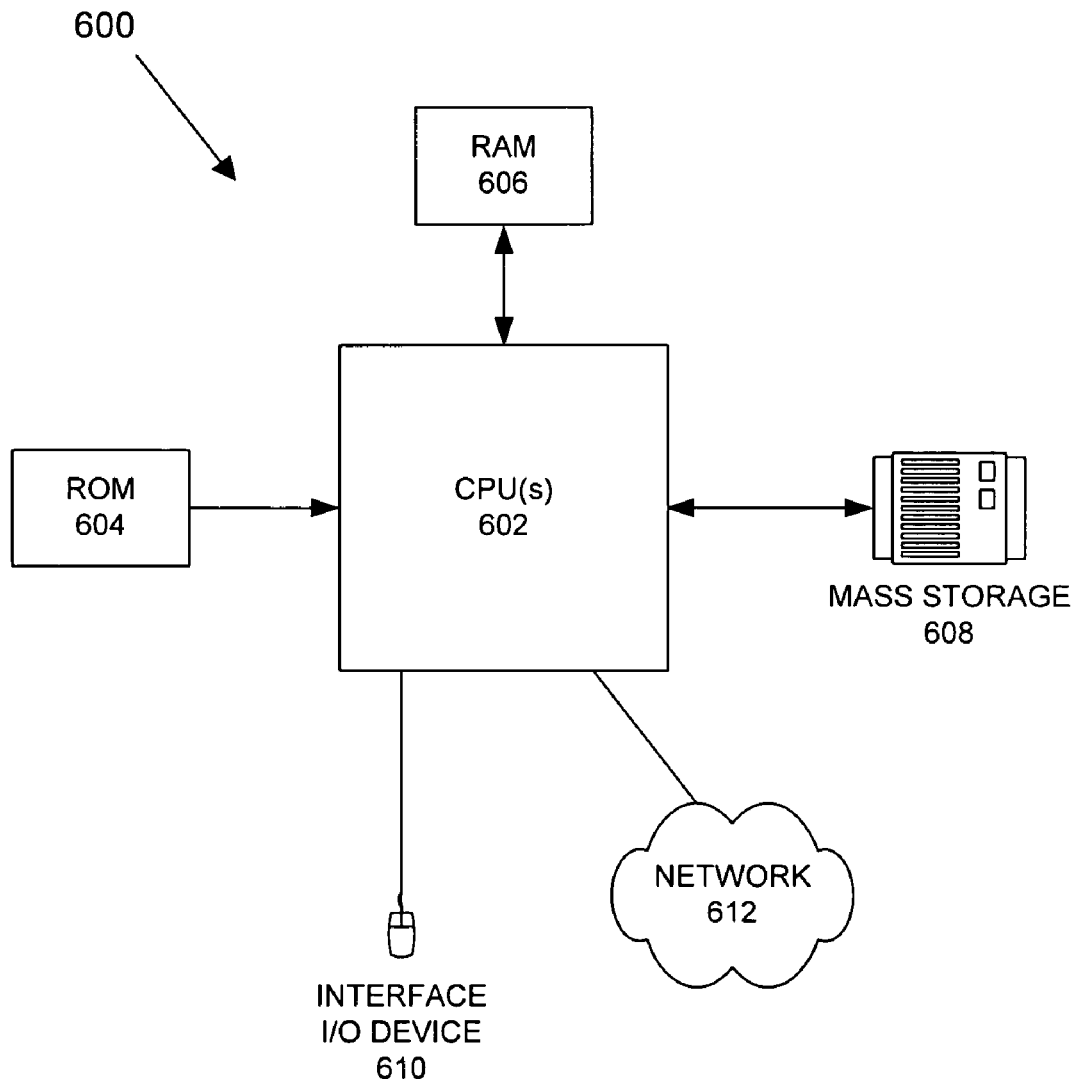
FIG. 6 is a block diagram of a typical computer system or integrated circuit system suitable for implementing embodiments of the present invention.

FIG. 6 illustrates a typical computer system that can be used by a user and/or controller in accordance with one or more embodiments of the present invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). As is well known in the art, primary storage 604 acts to transfer data and instructions uni-directionally to the CPU and primary storage 606 is used typically to transfer data and instructions in a bi-directional manner. Both of these primary storage devices may include any suitable of the computer-readable media described above. A mass storage device 608 also is coupled bi-directionally to CPU 602 and provides additional data storage capacity and may include any of the computer-readable media described above. The mass storage device 608 may be used to store programs, data and the like and is typically a secondary storage medium such as a hard disk that is slower than primary storage. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 also is coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 608 or 614 and executed on CPU 602 in conjunction with primary memory 606. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention is not limited to the details given herein but should be defined by the following claims and their full scope of equivalents, whether foreseeable or unforeseeable now or in the future.

What is claimed is:

1. A method of detecting crosstalk relationships among a group of DSL lines, wherein the crosstalk is caused by one or more offender lines and further wherein the crosstalk is received as interference by one or more victim lines, the method comprising:
   identifying a suspected offender line set comprising a plurality of lines;
   instructing a first line in the suspected offender line set to use a line profile with at least a first transmit spectrum in at least one selected tone that is distinguishable from any transmit spectrum used by any other line in the suspected offender line set;
   instructing a second line in the suspected offender line set to use a line profile with at least a second transmit spectrum in at least one selected tone that is distinguishable from the first transmit spectrum and any transmit spectrum used by any other line in the suspected offender line set;
   determining a noise spectrum from operational data collected from a potential victim line set comprising a single DSL line or plurality of DSL lines;
   evaluating the noise spectrum to determine whether the potential victim line set is affected by crosstalk from the first or second line of the suspected offender line set; and
   identifying at least one line in the suspected offender line set as an offender line and at least one line in the potential victim line set as a victim line based on the evaluation.

2. The method of claim 1 wherein evaluating the noise spectrum comprises analyzing collected operational data from the potential victim line set pertaining to at least one of the following:
   a noise spectrum received by a receiver on a DSL line in the potential victim line set;
   channel characteristics per subcarrier;
   SNR per subcarrier;
   bit distribution;
   margin;
   transmit power;
   line attenuation; or
   maximum attainable data rate.

3. The method of claim 1 wherein the at least one transmit spectrum comprises:
   a transmit spectrum characterized by disabling transmission on at least one subset of frequencies;
   a transmit spectrum in which transmit power level can vary by frequency;
   a transmit spectrum used during normal operation of the suspected offender line; or
   a transmit spectrum implemented using at least one of the following:
      a CARMASK parameter;
      a PSDMASK parameter;
      a power cutback parameter; or
      a subcarrier mask parameter.

4. The method of claim 1 further comprising evaluating for each subcarrier the level of crosstalk generated by a single suspected offender line into a single potential victim line to determine the absolute value of a crosstalk transfer function.

5. The method of claim 4 wherein evaluating for each subcarrier the level of crosstalk generated by a single suspected offender line into a single potential victim line to determine the absolute value of a crosstalk transfer function from the suspected offender line comprises:
   instructing the single suspected offender line to transmit data using a power-defined transmit spectrum;
   collecting operational data from the single potential victim line; and
   evaluating the noise spectrum of the potential victim line to determine the absolute value of the crosstalk transfer function.

6. The method of claim 1 wherein evaluating the noise spectrum further comprises controlling a transmit spectrum of the potential victim line set.

7. The method of claim 1 further comprising evaluating the noise spectrum of the potential victim line to determine the transmit spectrum of the first or second suspected offender line.

8. A non-transitory computer readable storage medium having program instructions stored thereon which, when executed by a processor, cause the processor to perform a method of detecting crosstalk relationships among a group of DSL lines, wherein the crosstalk is caused by one or more offender lines and further wherein the crosstalk is received as interference by one or more victim lines, the method comprising:
   identifying a suspected offender line set comprising a plurality of lines;
   instructing a first line in the suspected offender line set to use a line profile with at least a first transmit spectrum in at least one selected tone that is distinguishable from any transmit spectrum used by any other line in the suspected offender line set;
   instructing a second line in the suspected offender line set to use a line profile with at least a second transmit spectrum in at least one selected tone that is distinguishable from the first transmit spectrum and any transmit spectrum used by any other line in the suspected offender line set;
   determining a noise spectrum from operational data collected from a potential victim line set comprising a single DSL line or plurality of DSL lines;
   evaluating the noise spectrum to determine whether the potential victim line set is affected by crosstalk from the first or second line of the suspected offender line set; and
   identifying at least one line in the suspected offender line set as an offender line and at least one line in the potential victim line set as a victim line based on the evaluation.

9. A DSL system controller comprising:
   means for collecting DSL system operational data;
   means for generating DSL system instruction signals; and
   means for analyzing DSL system operational data coupled to the collecting means and to the signal generating means, wherein the analyzing means is configured to analyze collected operational data to detect crosstalk relationships among a group of DSL lines, the group including a plurality of suspected offender lines and at least one potential victim line, wherein crosstalk is caused by one or more offender lines and further wherein the crosstalk is received as interference by one or more victim lines, wherein a first line of the suspected offender lines is to be instructed to use a line profile with a first transmit spectrum in at least one selected tone that is distinguishable from any transmit spectrum used by any other suspected offender line and a second line of the suspected offender lines is to be instructed to use a line profile with a second transmit spectrum in at least one selected tone that is distinguishable from the first transmit spectrum and any transmit spectrum used by any other suspected offender line, wherein a noise spectrum is to be determined from the operational data collected from the at least one potential victim line, wherein the analyzing means is to evaluate the noise spectrum to determine whether the at least one potential victim line is affected by crosstalk from the first or second suspected offender line; and wherein the analyzing means is to identify at least one suspected offender line as an offender line and to identify the at least one potential victim line as a victim line based on the evaluation.

10. The DSL system controller of claim 9 wherein the instruction signals comprise at least one the following:
   instructing of the first or second suspected offender line to transmit data;
   programming of a CARMASK parameter of the a first or second suspected offender line;
   programming of a PSDMASK parameter of the first or second suspected offender line;
   programming of a power cutback parameter of the first or second suspected offender line; or
   programming of a subcarrier mask parameter of the first or second suspected offender line.

11. The DSL system controller of claim 9 wherein the collecting means is configured to collect DSL operational data from the at least one potential victim line, the operational data comprising at least one of the following:
   received noise spectrum information received by a receiver on at least one potential victim line;
   channel characteristic per subcarrier information of the at least one potential victim line;
   SNR per subcarrier information of the at least one potential victim line;
   bit distribution information of the at least one potential victim line;
   margin information of the at least one potential victim line;
   transmit power information of the at least one potential victim line;
   line attenuation information of the at least one potential victim line;
   maximum attainable data rate information of the at least one potential victim line.

12. The DSL system controller of claim 9 wherein the analyzing means is configured to evaluate a noise spectrum of the at least one potential victim line to determine whether the at least one potential victim line is affected by crosstalk from the first or second offender line.

13. The DSL system controller of claim 12 further wherein the analyzing means is configured to evaluate the absolute value of a crosstalk transfer function from an actual offender line to an actual victim line.

14. The DSL system controller of claim 10 further wherein the generating means is configured to send instruction signals to the at least one potential victim line by manipulating a line profile to control the transmit spectrum of the at least one potential victim line.

15. The DSL system controller of claim 12 further wherein the analyzing means is configured to evaluate the noise spectrum of an actual victim line to determine the transmit spectrum of an actual offender line.

* * * * *